UNITED STATES PATENT OFFICE.

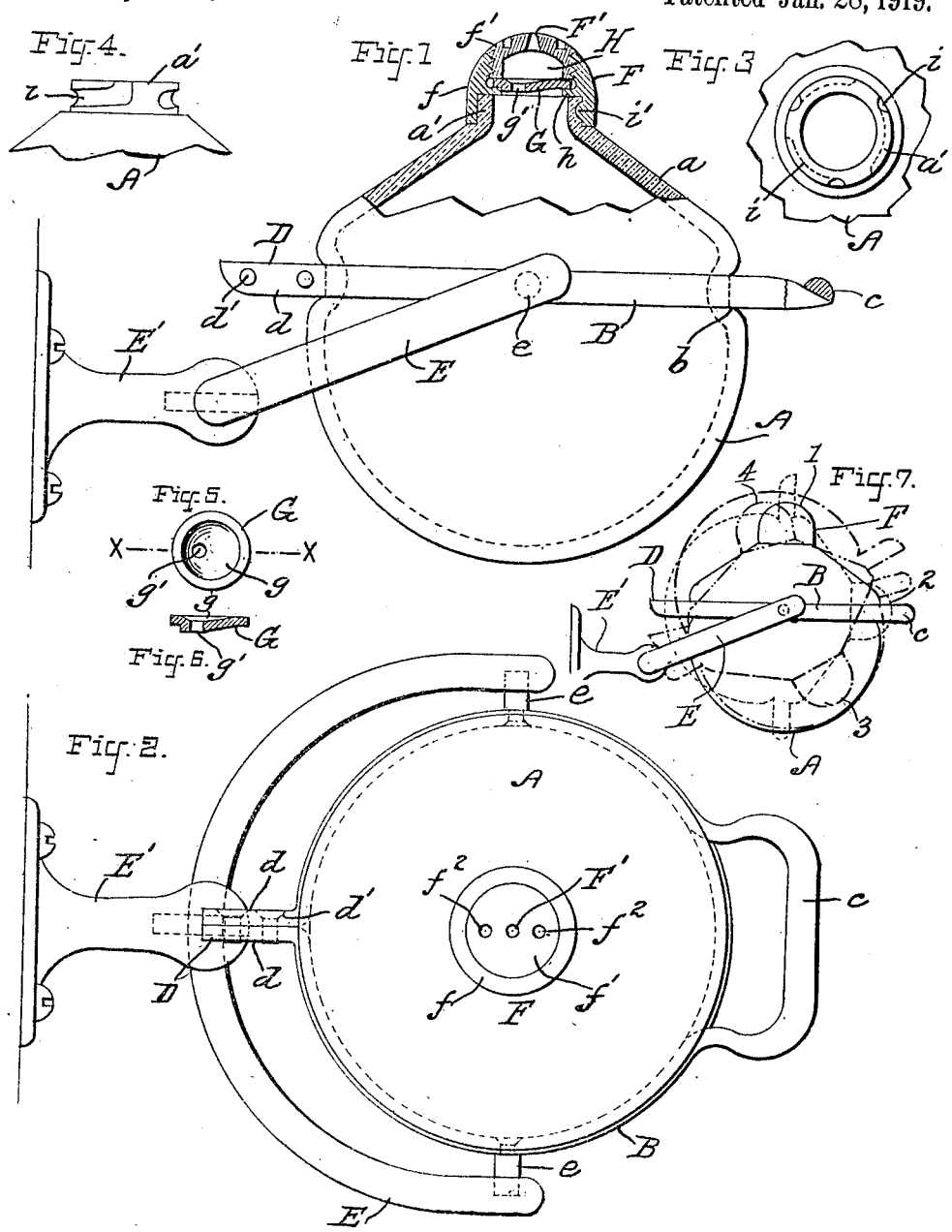

WILLIAM C. MORRILL, OF NEW YORK, N. Y.

SOAP-DISPENSER.

1,292,848.

Specification of Letters Patent.

Patented Jan. 28, 1919.

Application filed March 30, 1915. Serial No. 18,036.

*To all whom it may concern:*

Be it known that I, WILLIAM C. MORRILL, a citizen of the United States, residing at the city of New York, borough of Manhattan, county and State of New York, have invented a certain new and useful Soap-Dispenser, of which the following is a specification.

This invention is a device for dispensing liquid materials, and although it may be used for the delivery of liquid materials in general, said device is intended mainly for dispensing liquid soap.

The dispenser is mounted for rotation on a horizontal axis, said dispenser being turnable through an arc of approximately 180 degrees for bringing the outlet port into a downwardly pointing position so as to deliver the liquid material into the palm of the hand.

In my dispenser provision is made for precluding the premature delivery of the liquid material when the container is turned into a downwardly pointing position, and, accordingly, the container is equipped with means for checking the centrifugal force developed in the liquid by the rotation of the container.

Furthermore, provision is made for dislodging any free liquid which may remain in the checking chamber or in the ports or upon the surface of the delivery nozzle.

A salient feature of my invention is a delivery device free from moving parts and embodying a nozzle and a liquid-checking baffle, said nozzle and the baffle being positioned free from contact with, and above the level of the liquid in, the normal or at rest position of the rotatable container. The nozzle and the baffle are relatively positioned to produce a liquid checking chamber, said baffle being provided with an aperture constituting a feed inlet to the checking chamber and said nozzle being provided with an aperture forming a liquid outlet from said checking chamber.

As the container rotates through an arc of approximately 90 degrees, the liquid material is thrown by centrifugal force against the baffle, the latter thus operating as a check to the motion of the liquid and preventing its premature forcible delivery. As the container continues to turn toward the delivery position, some of the liquid passes through the feed port in the baffle and fills up most of the checking chamber, by which time the container has turned beyond the first quarter of rotation and the nozzle points downwardly. The liquid within the container now exerts pressure upon the liquid within the checking chamber through the feed port in the baffle, whereby some of the liquid is forced out of the checking chamber. The quantity of liquid thus delivered depends upon several factors, such as the liquid level within the container, the speed at which said container is rotated, the arc through which it turns, the size and shape of the container, the sizes of the feed port and the delivery port, and the atmospheric pressure. By properly designing the container, the atmospheric pressure shuts off the outflow of liquid when equilibrium is restored between the pressure of the external atmosphere and the pressure of the atmosphere and weight of the liquid within the container.

In my delivery device, the nozzle is fixedly attached to the container, and the baffle occupies a like relation to the nozzle. The delivery port in the nozzle is positioned centrally therein, but the feed inlet is provided in the baffle at a point preferably but not essentially in eccentric relation to the perimeter of said baffle, so that in a preferred form the feed inlet to the chamber is out of register or alinement with the delivery outlet from said chamber.

Furthermore, the baffle is depressed and the feed inlet is positioned at the bottom of said depression. It is apparent that the container may occupy any position relatively to the delivery nozzle and to the baffle, the port in which baffle is eccentrically positioned so that the parts operate as designed regardless of the position of the container with reference to the nozzle and the baffle.

The outlet through the nozzle is centrally positioned so that it is practically impossible to loosen said delivery nozzle by inserting a wire or nail into said outlet and thereby apply pressure to said nozzle for rotating and displacing it.

Other features of the invention and the advantages thereof will be apparent from the following detailed description.

In the drawings,

Figure 1 is a side elevation, partly in vertical section, of a machine for dispensing liquid soap constructed in accordance with this invention.

Fig. 2 is a plan view thereof.

Fig. 3 is a plan view of a portion of the container illustrating one means for securing interlocking connection between said container and a delivery nozzle.

Fig. 4 is a side elevation of the parts shown in Fig. 3.

Fig. 5 is a plan view of the baffle removed from the container and the delivery nozzle.

Fig. 6 is a cross section through the baffle on the line $x$—$x$ of Fig. 5.

Fig. 7 is a diagrammatic view illustrating by full lines the container in a normal position at 1, the dotted lines showing a number of other positions from 2 to 4 inclusive adapted to be assumed by the container in rotating to the delivery position and returning back to the normal full line position 1.

A designates a container for the liquid material, said container being of any suitable form, size and material. As shown more particularly in Fig. 1, the container is semi-globular with a tapering top portion $a$ terminating in a neck $a'$, said container being composed of glass, but it will be understood that the invention is not limited either to the form of the container or the material of which it is composed. The container is provided with a groove $b$ intermediate the semi-globular portion and the tapering portion, within which groove is positioned a ring B. Said ring is composed, preferably, of a single piece of material which is bent to form a pressure piece $c$, the end portions $d$ of said ring being extended and positioned in contact with each other so as to form a stop arm D. The lapping end portions $d$ are fastened together by any suitable means, such as screws $d'$, whereby the ring may be clamped into frictional contact with the container. By reference to Figs. 1 and 2 of the drawing it will be seen that the pressure piece $c$ and the stop arm D project from opposite sides of the supporting ring B, and intermediate said pressure piece $c$ and the stop arm D, the ring is provided with trunnions $e$, the latter being suitably attached to the ring and finding bearings in a yoke E. Said yoke is supported by any suitable means, such as the bracket E′ adapted to be fastened to a wall or other surface, but, obviously, the yoke may be supported by a post adapted to be fastened to a wash-stand and, furthermore, any other means may be employed for fixedly supporting the yoke E.

A salient feature of this invention consists of a nozzle F and a baffle G, said parts coöperating to produce a checking and delivery chamber H adapted to contain a quantity of liquid material for the purpose of delivering said quantity of liquid material when the container is turned to a substantially inverted position. The nozzle is shown more particularly in Fig. 1 as consisting of two parts, to wit, a collar $f$ and a plug $f'$. Said collar $f$ is provided with an interior shoulder $h$, said collar being interiorly threaded above the shoulder. The plug is externally threaded for the purpose of screwing said plug into the threaded part of the collar, thereby detachably connecting the plug to the collar. Said plug is shown as having apertures $f^2$ adapted to receive prongs of a suitable implement for the purpose of rotating the plug in order to attach it to or remove it from the collar, said plug being screwed into the collar so as to assume a substantially flush relation therewith. The liquid material flows out of the nozzle through a delivery port F′, the latter being positioned intermediate the apertures $f^2$. It is preferred to taper the delivery aperture F′ so that the liquid will drain away from said aperture when the container is in a normal upright position.

The baffle plate consists of a single piece of suitable material, preferably metal, the same being positioned intermediate the chamber of the container and the delivery port of the nozzle. Said baffle is shown in Fig. 5 as a disk, the material of which is depressed at $g$, said baffle being provided with a port $g'$ toward which the depressed portion slopes, so that in the normal position of the container and the baffle the liquid material will drain through the feed port into the chamber of the container. As shown more particularly in Fig. 1 the baffle G is supported within the nozzle by the shoulder $h$ of the collar $f$ and is held against said shoulder by screwing the plug $f''$ against it.

As shown, the delivery port F′, is positioned centrally in the nozzle, and the feed port $g'$ in the baffle is positioned eccentrically therein, but the relative positions of the delivery port and the feed port to the checking chamber are not essential.

The delivery nozzle is attached to the neck of the container either permanently or detachably, as desired. It is apparent that the collar of said nozzle may be fitted to the neck of the container and cemented thereto, but as herein shown the collar of the delivery nozzle is coupled detachably to the container. The collar is attached by the bayonet connection illustrated in Figs. 1, 3 and 4, said neck $a'$ being provided with grooves $i$ for receiving the projections $i'$ of the collar $f$, it being apparent that the collar is initially positioned for the projections to enter the grooves, after which the collar is rotated so that the projections operate to draw the collar firmly to a seat against the container. The delivery device is thus locked in a fixed position on the neck of the container, but when desired the collar may be turned in an opposite direction so as to release said collar from locking engagement with the container whereupon the entire delivery nozzle and the baffle can be readily removed from the container.

The container is normally suspended in a position at rest indicated at 1 in full lines in Fig. 7, but to operate pressure is applied to finger piece $c$ for imparting rotative movement to the container, and such pressure being removed, the container is returned by the weight of the liquid material therein back to the non-delivery position, the back and forth rotative movement of said container taking place quickly. As the container turns quickly through an arc of approximately 180 degrees, say from position 1 to position 3, the liquid material is thrown forcibly against the baffle, but in the quarter way around position 2 of the container, said baffle operates to arrest the outflow of the liquid through the delivery port, although some of the liquid flows into the checking chamber. As the container moves from the position 2 to delivery position 3, the liquid is free to flow from the checking chamber through the delivery port and directly into the palm of the hand. The quick impulse given to the container when pressure is applied to the finger piece may carry the container far enough around for the pressure piece 3 to contact with the yoke or the bracket, thus arresting the container at the dotted line position 3, during which movement the liquid may flow out of the delivery port and into the palm of the hand.

The quantity of liquid delivered at each operation may and does vary, the delivery being effected by the gravity flow from the checking chamber through the delivery port F' when the outlet points downwardly so that the liquid is deposited directly upon the palm of the hand. The amount of liquid which flows out is dependent upon the level of liquid within the container, the speed at which it is rotated, the arc of rotation, the shape and size of the container, the size of the feed port and the delivery port, and atmospheric pressure. With a container of the proper design, atmospheric pressure shuts off the outflow of liquid as soon as equilibrium is restored between the pressure of the atmosphere within the container and the weight of the liquid therein on the one hand and the pressure of the external atmosphere on the other hand, but as the weight of the liquid varies with the quantity inside of the container it is apparent that the quantity delivered will vary somewhat.

As herein stated, the central position of the delivery port in the nozzle prevents a person from detaching the nozzle from the container for the reason that a wire or nail cannot be thrust into the aperture and pressure applied to the nozzle. Again, the eccentric position of the feed port in the baffle obviates the necessity for accurate assemblage of the baffle and nozzle with respect to the container, for the reason that the several parts occupy an operative relation to each other regardless of the position of said baffle either to the nozzle or to the container.

It is apparent that the application of considerable pressure to the finger-piece $c$ will have a tendency to rotate the container beyond the delivery position, but in my machine the rotary motion of the container is arrested within fixed limits by the finger-piece $c$ and the stop arm D coöperating with the means employed for supporting the container. Thus, when pressure is applied to the finger piece $c$ and the container rotates beyond the delivery position, the finger piece $c$ comes into contact with the yoke E, thus arresting the rotative movement of the container in one direction, the nozzle then delivering the liquid at the position 3 in Fig. 7. As the container turns in an opposite direction by the weight of the liquid material therein, said container acquires sufficient momentum for the arm D to strike the yoke or bracket, and thus the container assumes the position at 4 in Fig. 7, whereby any free liquid is dislodged from the delivery aperture or the feed aperture. The liquid material is thus precluded from remaining in the apertures and clogging them. In this connection, it is desired to call attention to the fact that in the normal position of the container the free liquid will drain away from the baffle plate and the apertures $g'$ F', so that the liquid is returned to the chamber of the container.

In the manufacture of the supporting band B, it is preferred to employ the material known as half-round wire, or a rod semicircular in cross section and with a flat side. This rod is bent intermediate its ends to produce the pressure piece $c$, the curved side of the wire or rod being uppermost, as shown in Fig. 1, after which the wire or rod is bent into a substantially circular band with the ends $d$ in contact with each other. The container and the band are assembled for the flat surface of said band to enter the groove of the container, after which the screws are inserted and tightened for the purpose of clamping the band securely upon the container.

In my device the stop arm D and the pressure piece c are positioned at the points of greatest movement on the rotatable container. Assuming that a line is drawn horizontally through the container in the plane of the axis of movement afforded by the trunnions e e, it will be noted that the arm D is positioned on the band at a point midway between or equi-distant from the trunnions, and similarly, the pressure piece c is equi-distant from the trunnions e e, so that as the container is rotated the arm and the pressure piece will travel in arcs corresponding in length to the greatest travel of the container at any one point. The arm D and pressure piece operate not only to stop the container, but the resulting shock is sufficient to dislodge free liquid from the nozzle.

It is apparent that the parts f f′ composing the nozzle F may be economically manufactured and quickly assembled, but prior to screwing the plug f′ into the collar f the baffle G should be positioned within the collar so as to rest upon the ledge or shoulder h thereof, after which the plug is screwed into the collar so as to attach the two parts of the nozzle and to clamp the baffle fixedly in position. The baffle is preferably composed of metal and is stamped and depressed at one operation. It is not necessary to exercise care in the assemblage of the baffle within the collar of the nozzle, for the reason that the port g′ of the baffle is out of the register with the delivery aperture F′ of the nozzle in any position of the baffle relative to the nozzle, this result being due to the port g′ being eccentric to the perimeter of the baffle. It is apparent that the two parts of the nozzle and the baffle can be manufactured quickly and economically, said parts being assembled with facility. Furthermore, the nozzle as an entirety can be easily and quickly placed on the neck of the container, the bayonet joint providing a secure lock between the delivery nozzle and the container, but if desired additional key-controlled locking means may be resorted to for precluding the removal of the nozzle except by the operation of a suitable key.

Having thus fully described the invention, what I claim as new, and desire to secure by Letters Patent is:

1. A liquid dispensing device such as liquid soap, embodying a rotatable container and a delivery device the ports of which are free from the control of moving parts, said delivery device embodying a nozzle provided with a liquid checking chamber the inlet to which is free from contact with the liquid contents of said rotatable container in the at rest position of said container.

2. A liquid dispensing device such as liquid soap embodying a rotatable container and a delivery device the ports of which are free from the control of moving parts, said delivery device embodying a nozzle provided with a liquid checking chamber which, in the at rest position of the container, is above the level of the liquid in said container, the inlet to and the outlet from said checking chamber being normally free from contact with the liquid in said at rest position of the container.

3. A liquid dispensing device such as liquid soap embodying a rotatable container and a delivery device the ports of which are free from the control of moving parts, said delivery device embodying a nozzle and a liquid checking baffle, said baffle being positioned free from contact with the liquid within said container in the at rest position of said container.

4. A liquid dispensing device such as liquid soap embodying a rotatable container and a delivery device the ports of which are free from the control of moving parts, said delivery device embodying a chambered nozzle movable with said container, and a liquid checking baffle in fixed relation to the nozzle and the container, said nozzle being provided with a delivery port and said nozzle having a feed port.

5. A liquid dispensing device such as liquid soap embodying a rotatable container and a delivery device the ports of which are free from the control of moving parts, said delivery device embodying a nozzle fixed to said container, said nozzle being provided with a delivery port, and a liquid checking member positioned intermediate said nozzle and the chamber of the container and stationary with respect thereto, said member being provided with a feed port.

6. A device for dispensing liquid materials such as soap embodying a rotatable container and a delivery device the ports of which are free from the control of moving parts, said delivery device embodying a delivery member provided with a port, and a liquid checking member positioned intermediate the delivery member and the chamber of the container and fixed with respect thereto, said liquid checking member being provided with a feed port positioned out of the direct line of flow of the liquid material from the container chamber to the port of the delivery member.

7. A device for dispensing liquid materials such as soap embodying a rotatable container and a delivery device the ports of which are free from the control of moving parts, said delivery device embodying a nozzle provided with a delivery port, and a liquid checking baffle retained in fixed position to said container and the nozzle, said baffle being positioned intermediate the nozzle and the chamber of said container, said baffle being provided with a feed port.

8. A device for dispensing liquid materials such as soap embodying a rotatable container and a delivery device the ports of which are free from the control of moving parts, said delivery device embodying a nozzle provided with a delivery port, and a dished baffle positioned intermediate the nozzle and the chamber of said container, said baffle being provided with a feed port, said nozzle and the baffle in the at rest position of the container permitting free liquid material to drain away from said delivery port and the feed port.

In testimony whereof I have hereunto signed my name.

WILLIAM C. MORRILL.

Copies of this patent may be obtained for five cents each, by addressing the "Commissioner of Patents, Washington, D. C."